United States Patent
Li

(10) Patent No.: US 7,106,728 B1
(45) Date of Patent: Sep. 12, 2006

(54) SWITCHING BY MULTISTAGE INTERCONNECTION OF CONCENTRATORS

(75) Inventor: Shuo-Yen Robert Li, Hong Kong (CN)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/561,974

(22) Filed: May 1, 2000

(51) Int. Cl.
*H04L 12/50* (2006.01)

(52) U.S. Cl. .................................. 370/386; 370/389

(58) Field of Classification Search ........ 370/386–388, 370/389, 396, 398
See application file for complete search history.

(56) References Cited

U.S. PATENT DOCUMENTS

| | | | |
|---|---|---|---|
| 4,523,273 A | 6/1985 | Adams et al. | |
| 4,623,996 A | 11/1986 | McMillen | |
| 4,747,130 A * | 5/1988 | Ho | 379/269 |
| 4,852,091 A | 7/1989 | Li | |
| 4,899,334 A | 2/1990 | Shimizu | |
| 4,905,225 A | 2/1990 | Francois et al. | |
| 4,945,534 A | 7/1990 | Driscoll et al. | |
| 4,955,016 A * | 9/1990 | Eng et al. | 370/230 |
| 4,955,017 A | 9/1990 | Eng et al. | |
| 4,970,507 A | 11/1990 | Cooperman et al. | |
| 5,123,011 A * | 6/1992 | Hein et al. | 370/380 |
| 5,148,428 A | 9/1992 | Lee | |
| 5,166,926 A | 11/1992 | Cisneros et al. | |
| 5,184,346 A | 2/1993 | Kozaki et al. | |
| 5,216,668 A | 6/1993 | Zhang | |
| 5,299,317 A | 3/1994 | Chen et al. | |
| 5,303,383 A | 4/1994 | Neches et al. | |
| 5,353,283 A | 10/1994 | Tsuchiya | |
| 5,367,518 A | 11/1994 | Newman | |
| 5,367,520 A | 11/1994 | Cordell | |
| 5,369,635 A | 11/1994 | Gandini et al. | |
| 5,371,495 A | 12/1994 | Sturges et al. | |
| 5,396,231 A * | 3/1995 | Hein | 340/2.22 |
| 5,426,733 A | 6/1995 | Masui | |
| 5,450,074 A | 9/1995 | Yoshifuji | |
| 5,451,936 A | 9/1995 | Yang et al. | |
| 5,471,628 A | 11/1995 | Phillips et al. | |
| 5,483,541 A | 1/1996 | Linsky | |
| 5,500,858 A | 3/1996 | McKeown | |
| 5,506,840 A * | 4/1996 | Pauwels et al. | 370/397 |
| 5,517,495 A | 5/1996 | Lund et al. | |
| 5,541,914 A | 7/1996 | Krishnamoorthy et al. | |
| 5,566,179 A | 10/1996 | Kobayashi et al. | |
| 5,568,477 A | 10/1996 | Galand et al. | |
| 5,583,861 A | 12/1996 | Holden | |

(Continued)

OTHER PUBLICATIONS

Shuo-Yen Robert Li, "Optimal Multi-Stage Interconnection by Divide-and-Conquer Networks", Proceedings of the Second IASTED International Conference, Dec. 14-16, 1998, pp. 318-323.

*Primary Examiner*—Huy D. Vu
*Assistant Examiner*—Roberta A. Shand
(74) *Attorney, Agent, or Firm*—Akin Gump Strauss Hauer & Feld, LLP

(57) ABSTRACT

A method and apparatus for performing switching by multistage interconnection of switching elements with improved performance and low layout complexity is disclosed. The techniques of line grouping, concentrators, self-route control through sorting are applied to relieve the output contention problem and uneven incoming traffic. Further a new class of interconnection networks called the divide-and-conquer networks is disclosed, the networks have very modular structure and the optimal layout complexity amongst all multistage interconnection networks.

3 Claims, 7 Drawing Sheets

U.S. PATENT DOCUMENTS

| | | | |
|---|---|---|---|
| 5,600,630 A | 2/1997 | Takano et al. | |
| 5,602,844 A | 2/1997 | Lyles | |
| 5,623,698 A | 4/1997 | Stephenson et al. | |
| 5,671,222 A | 9/1997 | Chen et al. | |
| 5,689,505 A | 11/1997 | Chiussi et al. | |
| 5,689,506 A | 11/1997 | Chiussi et al. | |
| 5,724,349 A | 3/1998 | Cloonan et al. | |
| 5,724,351 A | 3/1998 | Chao et al. | |
| 5,768,270 A | 6/1998 | Ha-Duong | |
| 5,802,052 A | 9/1998 | Venkataraman | |
| 5,809,021 A | 9/1998 | Diaz et al. | |
| 5,841,775 A | 11/1998 | Huang | |
| 5,852,407 A * | 12/1998 | Ishii et al. | 340/2.21 |
| 5,859,846 A | 1/1999 | Kim et al. | |
| 5,896,371 A | 4/1999 | Kobayashi et al. | |
| 5,940,389 A | 8/1999 | Yang et al. | |
| 5,949,778 A * | 9/1999 | Abu-Amara et al. | 370/388 |
| 5,963,554 A | 10/1999 | Song | |
| 5,987,028 A | 11/1999 | Yang et al. | |
| 6,052,373 A | 4/2000 | Lau | |
| 6,058,112 A | 5/2000 | Kerstein et al. | |
| 6,067,298 A | 5/2000 | Shinohara | |
| 6,081,512 A | 6/2000 | Muller et al. | |
| 6,157,643 A * | 12/2000 | Ma | 370/389 |
| 6,160,806 A | 12/2000 | Cantwell et al. | |
| 6,215,786 B1 | 4/2001 | Larson et al. | |
| 6,219,349 B1 | 4/2001 | Kobayashi et al. | |
| 6,259,699 B1 | 7/2001 | Opalka et al. | |
| 6,307,854 B1 | 10/2001 | Webb | |
| 6,335,930 B1 | 1/2002 | Lee | |
| 6,370,155 B1 | 4/2002 | Cantwell et al. | |
| 6,400,708 B1 | 6/2002 | Bartholomew et al. | |
| 6,427,037 B1 | 7/2002 | Okayama | |
| 6,473,827 B1 | 10/2002 | McMillen et al. | |
| 6,493,347 B1 | 12/2002 | Sindhu et al. | |
| 6,553,031 B1 | 4/2003 | Nakamura et al. | |
| 6,556,725 B1 | 4/2003 | Kondo et al. | |
| 6,563,819 B1 | 5/2003 | Park | |
| 6,563,837 B1 | 5/2003 | Krishna et al. | |
| 6,600,741 B1 | 7/2003 | Chrin et al. | |
| 6,611,519 B1 | 8/2003 | Howe | |
| 6,621,828 B1 | 9/2003 | Field et al. | |
| 6,628,651 B1 | 9/2003 | Ryan et al. | |
| 6,647,017 B1 | 11/2003 | Heimann | |
| 6,657,998 B1 | 12/2003 | Li | |
| 6,714,562 B1 | 3/2004 | Calvignac et al. | |
| 6,721,324 B1 | 4/2004 | Shinohara | |
| 6,735,203 B1 | 5/2004 | Heiman | |
| 6,747,971 B1 | 6/2004 | Hughes et al. | |
| 6,757,281 B1 | 6/2004 | Irish | |
| 6,757,282 B1 | 6/2004 | Ofek | |
| 6,798,777 B1 | 9/2004 | Ferguson et al. | |
| 6,829,237 B1 | 12/2004 | Carson et al. | |
| 6,834,038 B1 | 12/2004 | Zelig et al. | |
| 6,850,524 B1 | 2/2005 | Troxel et al. | |
| 2002/0018475 A1 | 2/2002 | Ofek et al. | |
| 2002/0031124 A1 | 3/2002 | Li | |
| 2002/0176526 A1 | 11/2002 | Mejia | |

* cited by examiner

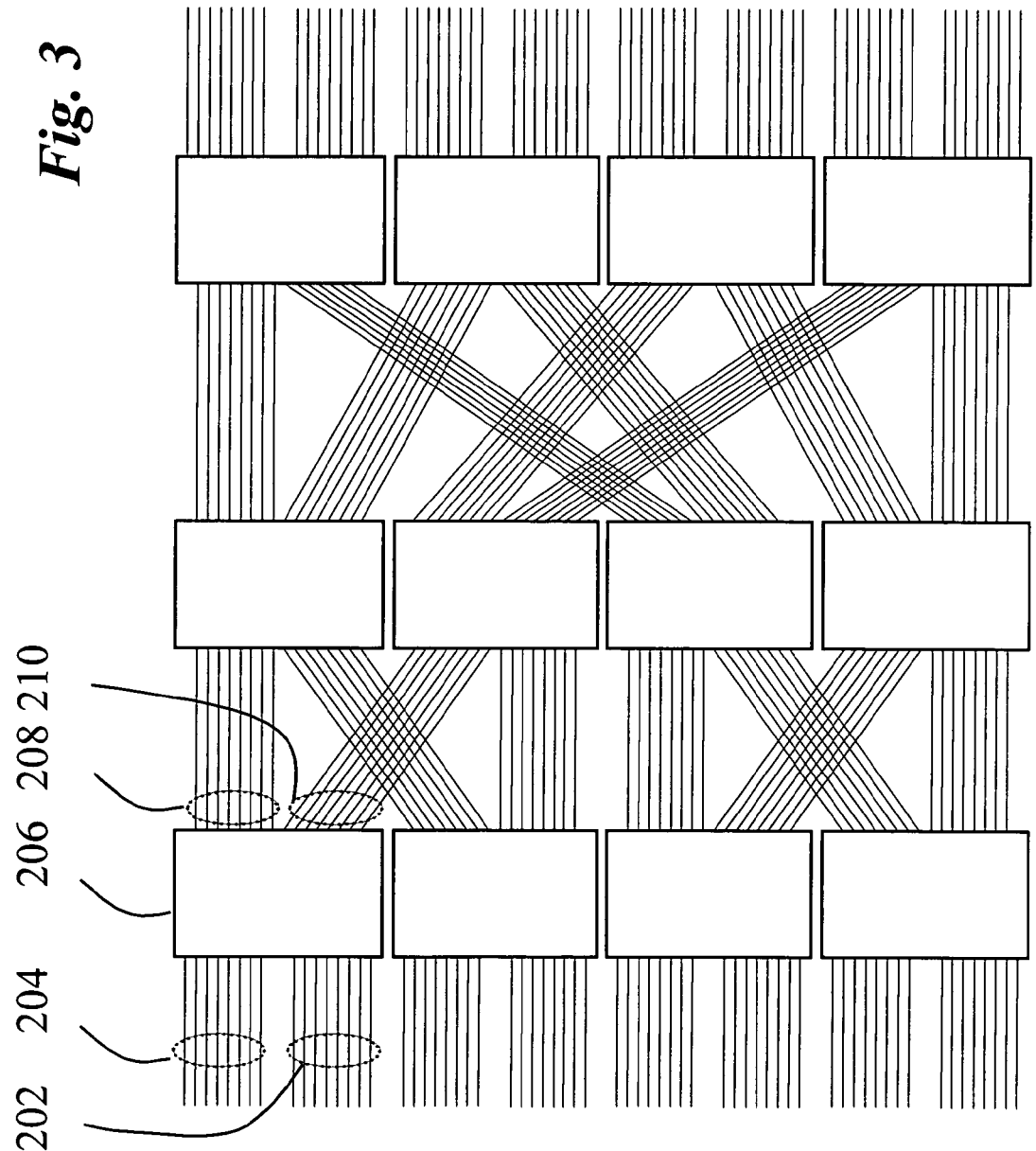

SWITCHING BY MULTISTAGE INTERCONNECTION OF CONCENTRATORS

BACKGROUND OF THE INVENTION

1. Field of the Invention

The present invention generally relates to data communication systems and more particularly relates to method and systems for self-route switching by multistage interconnection of switching elements.

2. Background of the Invention

In telecommunications, a switch is a network device that selects a path or circuit for sending a unit of data to its next destination. A switch may also include the function of the router, a device or program that can determine the route and specifically what adjacent network point the data should be sent to. On larger networks, the trip from one switch point to another in the network is called a hop. The time a switch takes to figure out where to forward a data unit is called its latency. Generally, the price paid for having the flexibility that switches provide in a network is this latency.

Switches are found at the backbone and gateway levels of a network where one network connects with another and at the subnetwork level where data is being forwarded close to its destination or origin. Therefore the needs for great flexibility as well as speed performance of the switches are always demanded.

SUMMARY OF THE INVENTION

To alleviate the problem of blocking in a network of routing cells, such as a banyan-type network, the technique of line grouping is disclosed. According to one aspect of the present invention, every routing cell is replaced by a 2n-to-n self-route concentrator, where n is a fixed number. Meanwhile every interconnection line between cells is replaced by a bundle of n lines. Such a scheme makes use of the statistical nature of the signal distribution. It reduces the blocking rate in switching, while maintaining the self-route control of the multistage interconnection networks. The techniques of line grouping can be applied in conjunction with any construction of 2n-to-n self-route concentrators.

Moreover, a new class of interconnection networks, namely the divide-and-conquer networks, is described as well. These networks have very modular structure and achieve an optimal layout complexity amongst all multistage interconnection networks. The combined technique of line grouping and concentrators achieve particularly good performance when applied to divide-and-conquer networks. Furthermore, one embodiment of the present invention based on divide-and-conquer networks can be achieved through in the fashion of three-dimensional packaging.

The present invention may be implemented in numerous ways including a method, a product, a system, and an apparatus, each yields one or more of the following benefits and advantages. One of them is the scale flexibility that can accommodate any switch configurations. Another one is the switching performance that none of the existing switching techniques could achieve. Still another one is the modular, scalable, symmetric architecture that can render the productions of network switches in a larger scale at relatively low cost.

Other objects, benefits and advantages together with the foregoing are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

FIG. 3 is a representation of an 8-line version of the 8×8 network in FIG. 2. It is also called a 64×(8*8) switching network;

DETAILED DESCRIPTION OF THE PREFERRED EMBODIMENTS

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble the operations of data processing devices coupled to networks. These process descriptions and representations are the means used by those experienced or skilled in the art to most effectively convey the substance of their work to others skilled in the art. The present invention is techniques for routing/switching packets at an optimum speed. The method along with the apparatus or system, computer related products to be described in detail below is a self-consistent sequence of processes leading to one or more desired results. These processes are those requiring physical manipulations of physical quantities. Usually, though not necessarily, these quantities may take the form of electrical signals (e.g. data) capable of being stored, transferred, combined, compared, displayed and otherwise manipulated in a computer system or electronic computing systems. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or the like, refer to the actions and processes of a computing system that manipulates and transforms data represented as physical quantities within the computing device's registers and memories into other data similarly represented as physical quantities within the computing device or other such as storage, transmission or processing devices.

There are various types of packet switching architectures, such as crossbar, shared-buffer-memory, and multi-stage switching network. The former two architectures are more suitable for small switches due to the centralized control and memory speed. Multistage switching networks, on the other hand, can use self-route mechanism and therefore is suitable for large switches.

Figure 2:
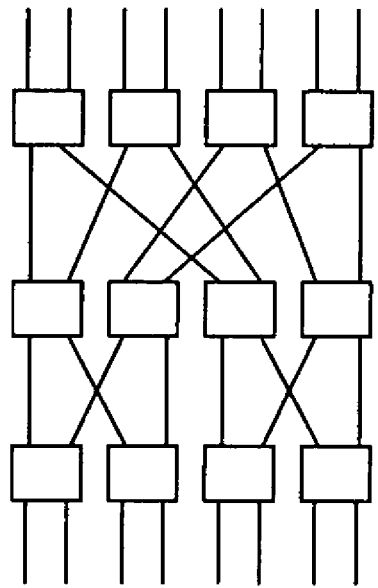
FIG. 2 is a representation of the 8×8 divide-and-conquer network, which happens to be identical with the 8×8 inverse baseline network.
Figure 1:
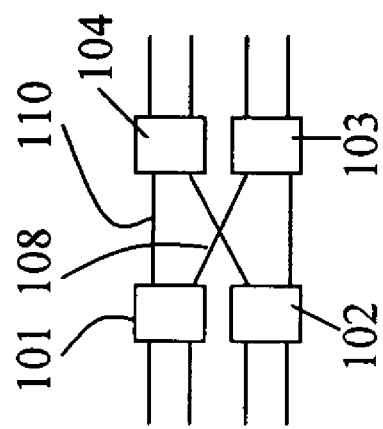
FIG. 1 is a representation of a 4×4 multistage interconnection network.

The building blocks for a multi-stage switching network are mainly 2×2 routing cells (101–104) as shown in FIG. 1, which are 2×2 switches. A $2^n \times 2^n$ banyan-type network is an n-stage interconnection network of routing cells. Each stage includes $2^{n-1}$ parallel routing cells, and the outputs of the routing cells in a stage are connected to the inputs of the routing cells in the next stage. The connection pattern between two stages is called an interstage exchange, and all the interstage exchanges together specify an instance of the banyan-type network provided that every input of the whole network is connectable to every output. Essentially, FIG. 1 depicts a 4×4 switching network and FIG. 2 depicts an 8×8 switching network 100 which is called the inverse baseline network 200.

Each of the two incoming signals to a routing cell carries an in-band control signal for the switching control of the routing cell. The signal is "0-bound", "1-bound", or "idle". The two output ports of a routing cell are "0-output" (110) and "1-output" (108) so that the routing cell is going to route the maximum number of 0-bound (resp. 1-bound) signals to the 0-output (resp. 1-output), that is, so that the 0-output (resp. 1-output) will be occupied by a 0-bound (resp. 1-bound) signal unless no input signal is 0-bound (resp. 1-bound).

When both input signals to a routing cell are 0-bound or both are 1-bound, there is a contention. In that case, only one of the signals can be correctly routed and the other will be either blocked or misrouted. There are some existing techniques, such as deflection or dilation, to cope with this issue. The deflection approach routes the two conflicting signals to the two outputs, respectively, and attempts to correct the misrouting of one of the two signals afterwards. The dilation approach provides redundancy in the interstage exchanges and creates a plurality of 0-outputs (resp. 1-outputs) in each node. Both approaches require complicated hardware and complicated switching control.

To better understand the present invention, the article entitled "ATM Switching by Divide-and-Conquer Interconnection of Partial Sorters", authored by S.-Y. R. Li and W. Lam, and published in Microprocessors and Microsystems 22, May 3, 1999, pages 579–587, is hereby incorporated by reference.

1. Interconnection Network with Line Grouping and Concentrators

Statistical line grouping creates a "multi-lined version" of any type of structure that involves interconnection lines among its internal elements. This technique replaces an interconnection line between two nodes with a bundle of lines. Concomitantly, the number of I/O of every node expands proportionally, i.e., node is proportionally dilated. The underlying statistical principle is the "large-group effect" in diluting the blocking probability.

The technique of line grouping can be applied to the interconnection network comprising 2×2 routing cells: Instead of two input ports and two output ports, each 2×2 routing cell is dilated into a routing node (206) with two groups (202, 204) of input ports and two groups (208, 210) of output ports. The two output groups are called 0-output group (208) and the 1-output group (210). Similarly, the two input groups are called 0-input group and the 1-input group 204. Ports in each output group 202 are indistinguishable, so that the routing of a signal to any port within a group is just as good as routing to any other port in the group. The output groups of all routing nodes at a stage are connected to the input groups of routing nodes at the next stage. With reference to FIG. 3, application of line grouping with the line-bundle size 8 to the 8×8 inverse baseline network in FIG. 2 results in a 64×64 network comprises 16×16 routing nodes. As the 8 output ports in each output group of this network are indistinguishable, the network is named as a 64×(8*8) router. Every N×N banyan-type network includes $\log_2 N$ stages of cells with N/2 cells at each stage (4 cells for the case in FIG. 2). When every output group is linked to an 8×8 switch, the function of 64×64 switching is achieved.

In an interconnection network with the line-bundle size n, each routing node is dilated to a 2n×2n concentrator (206) that routes the maximum number of 0-bound (resp. 1-bound) signals to the 0-output (resp. 1-output) group. By way of specificity, as is evident from the structure of concentrator 206 in FIG. 3 and the discussion of the foregoing paragraph, concentrator 206 is best understood in terms already used to describe FIGS. 1 and 2. A primitive concentrator, as exemplified by concentrator 206, is a routing device with 2n input ports and 2n output ports where the upper n output ports form the 0-output group and the lower n ports form the 1-output group. As a convenient short-hand notation, a concentrator with these properties is referred to as a "2n×2n 2n-to-n concentrator" or, more simply, a "2n-to-n" concentrator.

2. Self-Route Mechanism

An interconnection network performs self-route switching if every routing node adopts in-band control for setting its connection state. For an interconnection network of 2×2 routing nodes, 2×2 sorters can be used to sort its input signals according to the following 2-bit sequence:

10<00<11

In a $2^n \times 2^n$ interconnection network, each input signal has routing tag comprising an activity bit following by n address bits. Each of the n address bits indicates the output preference in the routing node in a particular stage, and is consumed at that routing node during passing through this stage. With such routing tag the 2×2 sorters are equivalently sorting its input signals according to:

"intended 0-bound"<"idle"<"intended 1-bound"

In the interconnection network of group or line-bundle size N, self-route mechanism is used to control the routing of signals if each node is a as expressed more concisely in the short-hand notation, a 2N-to-N concentrator which sorts its input signals according to the 2-bit sequence:

10<00<11

This achieves the purpose of routing the maximum number of 0-bound (resp. 1-bound) signals to its N 0-outputs (resp. 1-outputs).

A routing cell takes the initial two bits from each input packet as the in-band control signal. Suppose an active input port generates an activity bit followed by the address bit plus possibly non-control bits. The address bit indicates the preference between the two outputs of the cell. Meanwhile, an idle expression is a string of '0' bits. Thus the in-band control signal of an intended 0-bound packet, an intended 1-bound packet, and an idle expression is 10, 11, and 00, respectively. The underlying linear order 10<00<11 of a routing cell in this case translates into 'intended 0-bound'<'idle'<'intended 1-bound'

The following table shows the connection state of a routing cell.

|  | Input-1 control signal | | |
|---|---|---|---|
| Connection state | '10' | '00' | '11' |
| Input-0 control signal | | | |
| '10' | Any | Bar | Bar |
| '00' | Cross | Any | Bar |
| '11' | Cross | Cross | Any |

When a network comprises a large number of switch nodes, the speed of the switching control over the whole network depends upon how distributed it is. A distributed form of the control would be for every packet to be prefixed by an in-band control signal upon entering a switching node so that the switching decision at the node is purely by the in-band signals carried by input packets. An in-band control mechanism over a packet switching network qualifies as self routing if the control signal of a packet to a switching node is determined by just the I/O addresses of this packet.

In broadband applications, the control signal of a packet to a switching node needs to be contained in as few bits as possible so that the switching decision can be swiftly executed.

Upon entering the network, a packet is prefixed by its binary destination address $d_1 d_2 \ldots d_n$ for in-band control. The bit $d_j$ indicates the preference between the two outputs of the stage-j cell and is consumed by the stage-j switching control. The bar/cross state of a switching cell is determined by just this leading bit of each of the two input packets. When two packets contend for the same output of a cell, one of them has to be misrouted or blocked. Normally an application would allow the possibility of an idle input, hence the in-band control signal would actually include an 'activity bit' up front in order to differentiate from an idle expression 00 . . . 0. Thus the in-band control signal normally is $1 d_1 d_2 \ldots d_n$.

A packet destined for binary $(d_1 d_2 \ldots d_n)$ is prefixed with the binary control stream $1 d_{\gamma(1)} d_{\gamma(2)} \ldots d_{\gamma(n)}$. The whole packet entering the switching network is thus formatted as

| In-band control signal | Data |
|---|---|
| $1 d_{\gamma(1)} d_{\gamma(2)} \ldots d_{\gamma(n)}$ | e.g., an ATM cell or an IP packet |

By the time the bit stream reached stage j, the segment $d_{\gamma(1)} d_{\gamma(2)} \ldots d_{\gamma(j-1)}$ has been consumed so that the two leading control bits will be $1 d_{\gamma(j)}$. The stage-j switching control reads just these two bits from the packet.

This switching control can be described by a finite-state automata with the three states Initial, Bar and Cross. The Initial state is arbitrarily associated with a tentative connection state, bar or cross. The prompt to the automata consists of the two leading bits (=00, 10 or 11) from each of the two synchronous data inputs. The two data inputs generate a total of nine different prompts. Upon a prompt, the switching cell reproduces the activity bit at active outputs and latches the connection state into bar or cross, corresponding to the automata state Bar or Cross, respectively. Afterwards, subsequent bits simply flow through the latched connection state of the cell. When both input signals present '10' in the leading bits or both present '11', the output contention occurs. It can be arbitrated in various ways resulting in either the deflection (i.e., misrouting) or blocking of one of the two packets. An additional prompt to the automata is the frame clock from a non-data input. It resets the cell to the Initial state. The following table shows the automata action in a self-route switching cell.

| Prompt | State = Initial | State = Bar | State= Cross |
|---|---|---|---|
| 00 and 00 | Output 0 and 0; | | ; |
| 00 and 10 | Output 1 and 0; State ← Cross; | | |
| 00 and 11 | Output 0 and 1; State ← Bar; | | |
| 10 and 00 | Output 1 and 0; State ← Bar; | | |
| 10 and 10 | Arbitration of output contention | | |
| 10 and 11 | Output 1 and 1; State ← Bar; | | |
| 11 and 00 | Output 0 and 1; State ← Cross; | | |
| 11 and 10 | Output 1 and 1; State ← Cross; | | |
| 11 and 11 | Arbitration of output contention | | |
| Frame clock | ; | | State ← Initial; |

In the actual VLSI implementation of the cell control, the two leading bits from an input are preferably handled one at a time in order to simplify the logic.

3. Divide-and-Conquer Networks

Figure 4:
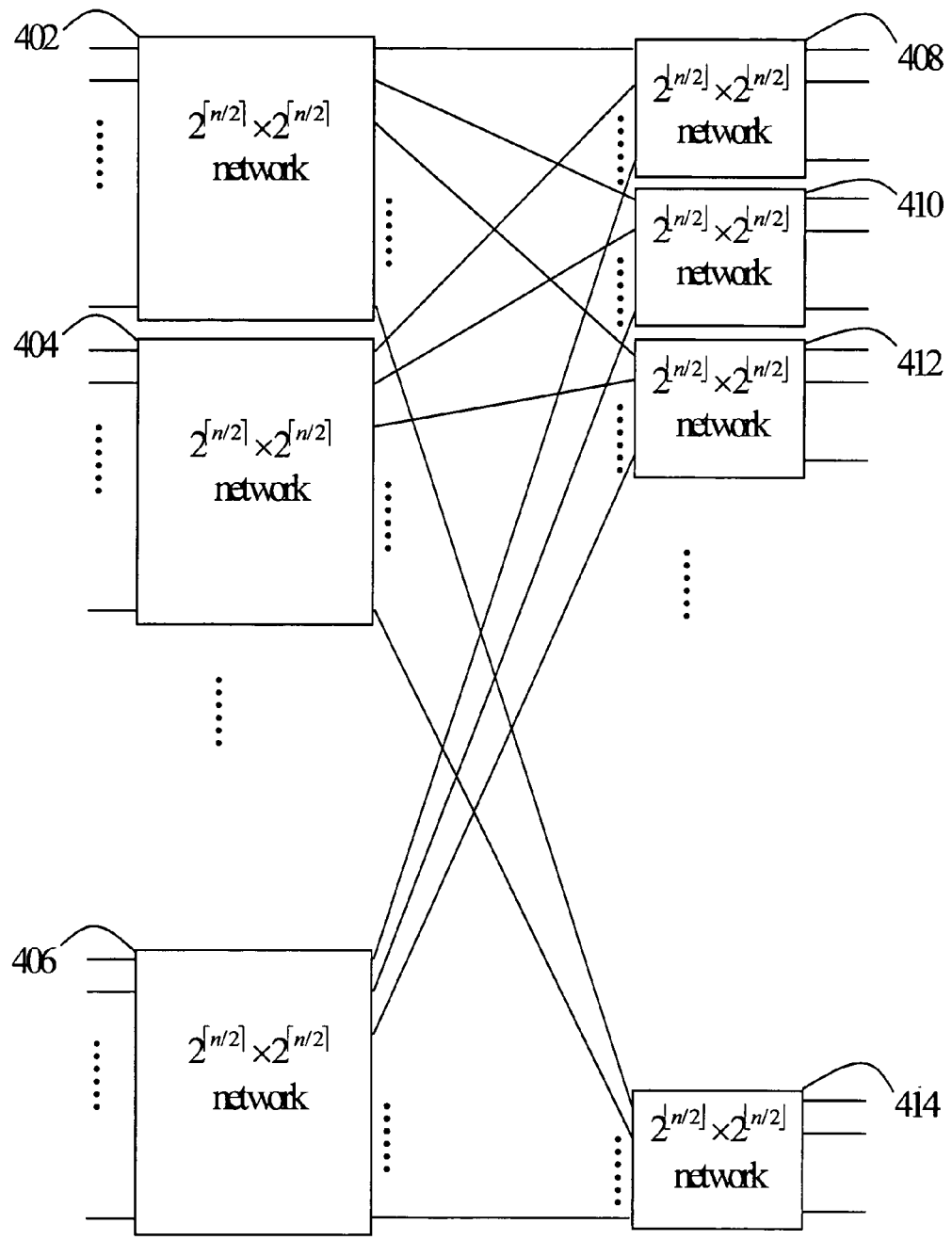
FIG. 4 shows the construction of a $2^n \times 2^n$ divide-and-conquer network recursively by smaller divide-and-conquer networks.

One of the features in the present invention is a class of interconnection networks, termed the divide-and-conquer networks, that have very modular structure and achieve optimal layout complexity. With reference to FIG. 4, a $2^n \times 2^n$ divide-and-conquer network is constructed recursively by two stages of smaller divide-and-conquer networks. The first stage comprises of $2^{\lfloor n/2 \rfloor}$ copies of $2^{\lceil n/2 \rceil} \times 2^{\lceil n/2 \rceil}$ divide-and-conquer networks (402, 404, 406), while the second stage comprises of $2^{\lceil n/2 \rceil}$ copies of $2^{\lfloor n/2 \rfloor} \times 2^{\lfloor n/2 \rfloor}$ divide-and-conquer networks (408, 410, 412, 414). Here the notation $\lceil \cdot \rceil$ stands for the arithmetic operation "ceiling" and $\lfloor \cdot \rfloor$ for the arithmetic operation "floor". The networks in the two stages are connected as: the i-th output port of the j-th first-stage network is connected to the j-th input port of the i-th second-stage network. The base case of such recursive construction is the 2×2 divide-and-conquer network which is just a 2×2 routing cell.

FIG. 3 was presented earlier as an example of an application of line grouping with a line-bundle size 8 to the 8×8 inverse baseline network in FIG. 2. From another viewpoint, the arrangement of FIG. 3 is also identical to an 8-line bundle version of an 8×8 divide-and-conquer network.

Figure 5:
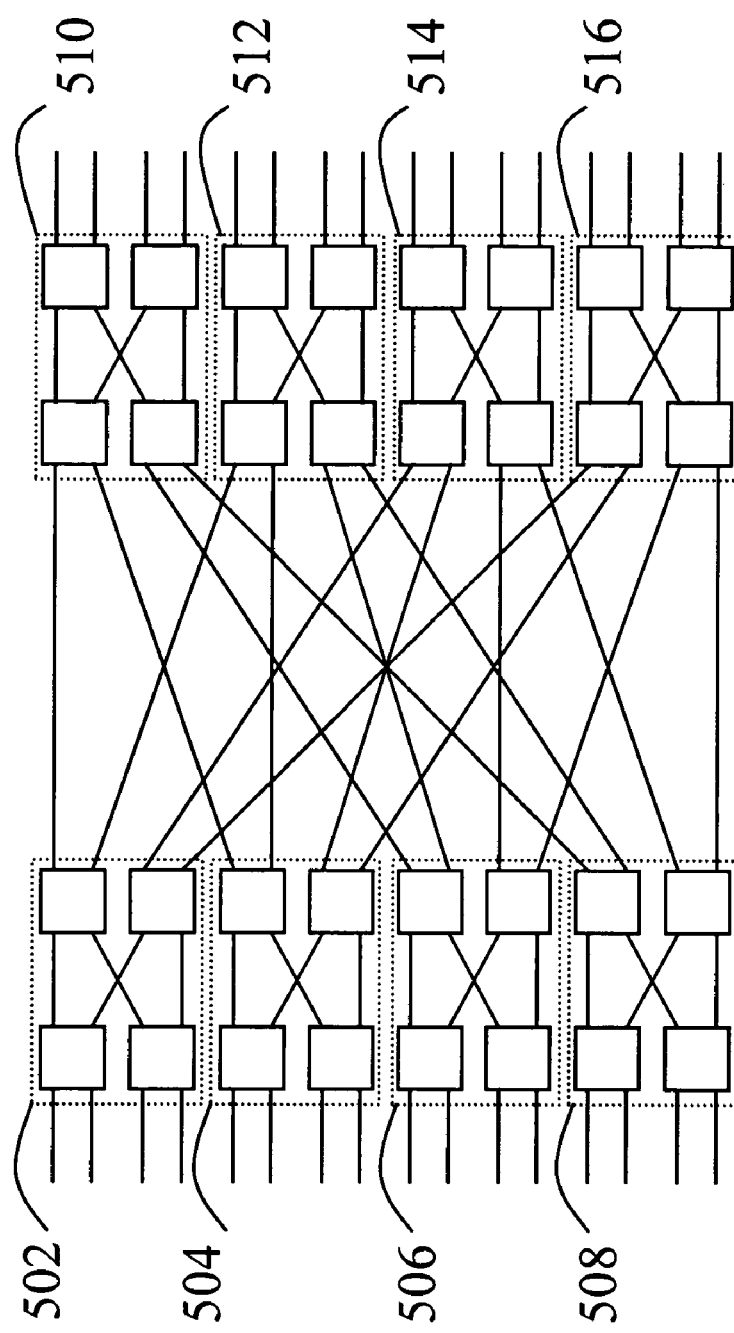
FIG. 5A is a representation of the 16×16 divide-and-conquer network.
FIG. 5B is the dilated version of the network of FIG. 5A depicting interposed line bundles and the commensurate plurality of input and output leads resulting from dilation of the networks of FIG. 5A.

FIG. 5A shows the 16×16 divide-and-conquer network. Each of the two stages comprises of 4 copies of 4×4 divide-and-conquer networks (502, 504, 506, 508, 510, 512, 514, 516).

FIG. 5B depicts the arrangement of FIG. 5A when each of the 2×2 routing cells is dilated in a manner commensurate with the generation of FIG. 3 as derived from FIG. 2. FIG.

5A is a 16×16 divide-and-conquer network, so that FIG. 5B may then be described as an 8-line version of the 16×16 divide-and-conquer network. Similar to FIG. 3, FIG. 5B is a 128×128 network composed of 16×16 routing nodes resulting from the application of line grouping with line-bundle size 8 to the 16×16 divide-and-conquer network wherein each 16×16 routing node is a 16×16 16-to-8 concentrator. As the 8 output ports in each output group of this network are indistinguishable, the network is named as a 128×(16*8) router. When every output group is linked to an 8×8 switch, the function of 128×128 switching is achieved. By way of reiteration, FIG. 5B highlights three important aspects of dilation, namely: each input line serving the overall network is replaced by 8 input lines (e.g., input lead 5011 of 4×4 network 5021), and similarly for each output line; each line interconnecting the various networks (e.g., 5021 to 5101) is also replaced by a bundle of size 8; and each 2×2 routing cell (e.g., 501) is enlarged to a 16×16 16-to-8 concentrator (e.g., 5001).

Figure 6:
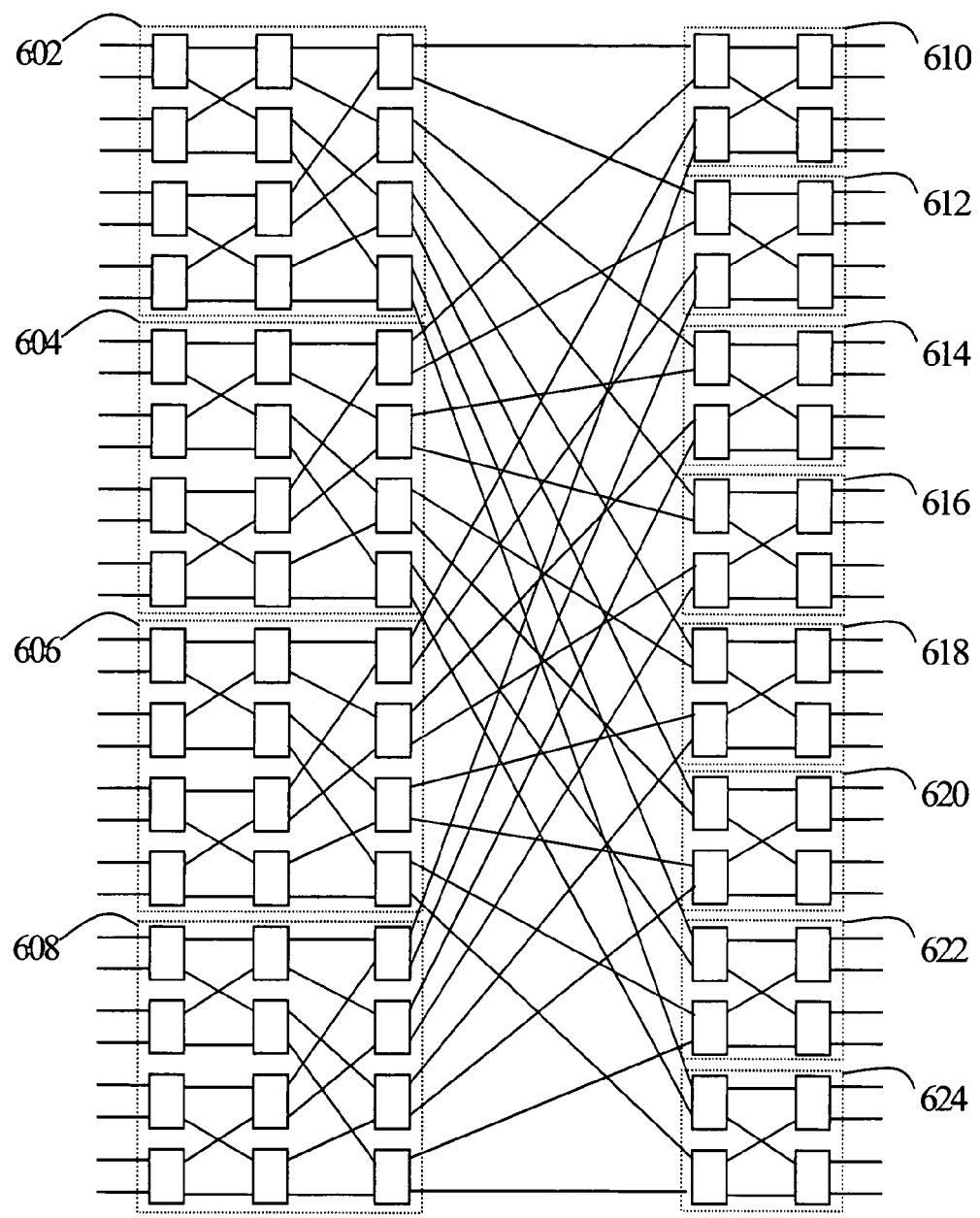
FIG. 6 is a representation of the 32×32 divide-and-conquer network.

FIG. 6 shows the 32×32 divide-and-conquer network. The first stage comprises of 4 copies of 8×8 divide-and-conquer networks (602, 604, 606, 608), and the second stage comprises of 8 divide-and-conquer networks of size 4×4 (610, 612, 614, 616, 618, 620, 622, 624).

Figure 7:
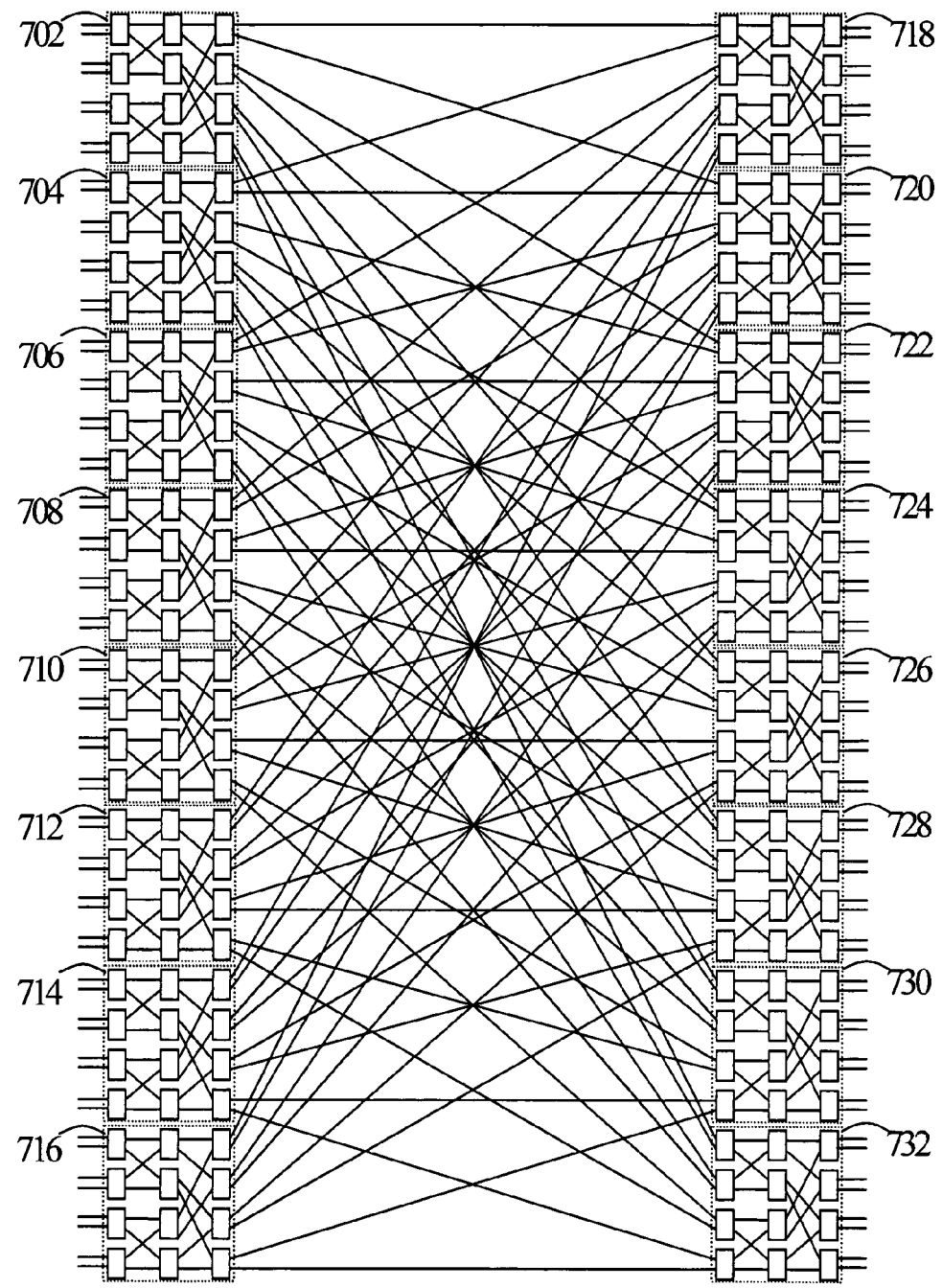
FIG. 7 is a representation of the 64×64 divide-and-conquer network.

FIG. 7 shows the 64×64 divide-and-conquer network. Each of the two stages comprises of 8 divide-and-conquer networks of size 8×8 (702, 704, 706, 708, 710, 712, 714, 716, 718, 720, 722, 724, 726, 728, 730, 732).

The recursive construction of a divide-and-conquer network gives rise to a very modular structure. In particular, for the $2^n \times 2^n$ divide-and-conquer network where n is even, each of the two stages will comprise of $2^{n/2}$ divide-and-conquer networks of size $2^{n/2} \times 2^{n/2}$.

4. Three-Dimensional Packaging of Divide-and-Conquer Networks

The interconnection pattern of the two stages in a divide-and-conquer network seems to be complicated at the first sight. Actually, this connection pattern can be realized efficiently when the whole network is packaged in a three-dimensional manner.

Figure 8:
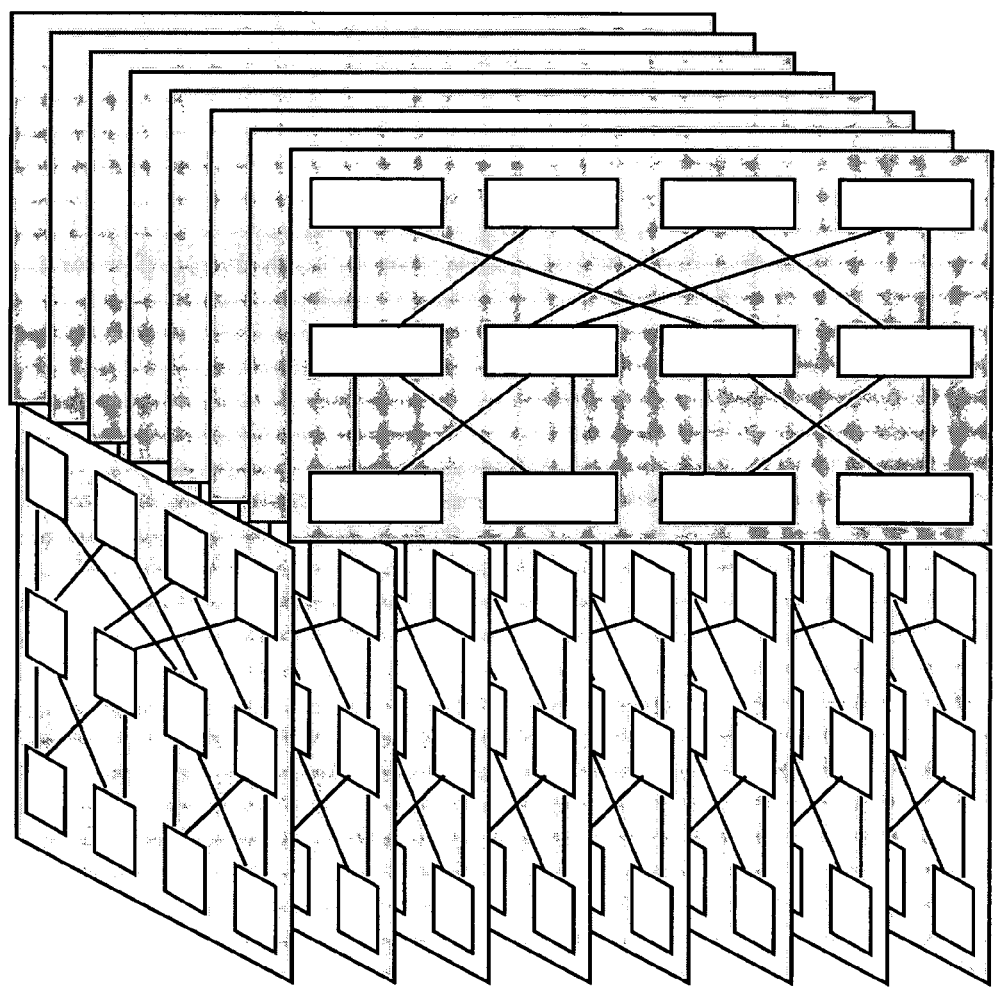
FIG. 8 depicts the interconnection of components of the 64×64 divide-and-conquer network in the fashion of three-dimensional packaging.

The networks in the first stage are mounted as horizontal boards 802, and the networks in the second stage is mounted as vertical boards 804. The middle interconnection pattern will be equivalent to the contact points between the two perpendicular stacks of planes as depicted by FIG. 8.

The performance of a divide-and-conquer network can also be improved by the techniques of line-grouping and concentrators.

Those skilled in the art will appreciate by now that the present invention described above may be implemented in numerous ways including a method, a software product, a system, and an apparatus, each yields one or more of the following benefits and advantages. One of them is the scale flexibility that can accommodate any switch configurations. Another one is the switching performance that none of the existing switching techniques could achieve. Still another one is the modular, scalable, symmetric architecture that can render the productions of network switches in a larger scale at relative low cost.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. A switching system for routing input signals-comprising:
    a plurality of dilated routing nodes arranged in a plurality of stages, each of the dilated routing nodes being generated by enlarging a conventional routing node by a predetermined factor, each of the dilated routing nodes having a 0-input group and a 1-input group, and a 0-output group and a 1-output group, each group sized according to the predetermined factor, and each of the dilated nodes including means, responsive to the input signals which include 0-bound or 1-bound signals with respect to each of the dilated routing nodes, for statistically routing the 0-bound input signals to the 0-output group and 1-bound input signals to the 1-output group and routing a number of the 0-bound input signals exceeding a size of the 0-output group to the 1-output group, and routing a number of the 1-bound input signals exceeding a size of the 1-output group to the 0-output group, and
    line bundles interconnecting each output group of each of the dilated routing nodes in a given one of the stages to a predetermined input group of a pre-selected one of the dilated routing nodes in the next succeeding one of the stages, wherein the dilated routing nodes are interconnected as a divide-and-conquer interconnection network.

2. A switching system for routing input signals-comprising:
    a plurality of dilated routing nodes arranged in a plurality of stages, each of the dilated routing nodes being generated by enlarging a conventional routing node by a predetermined factor, each of the dilated routing nodes having a 0-input group and a 1-input group, and a 0-output group and a 1-output group, each group sized according to the predetermined factor, and each of the dilated nodes including means, responsive to the input signals which include 0-bound or 1-bound signals with respect to each of the dilated routing nodes, for statistically routing the 0-bound input signals to the 0-output group and 1-bound input signals to the 1-output group and routing a number of the 0-bound input signals exceeding a size of the 0-output group to the 1-output group, and routing a number of the 1-bound input signals exceeding a size of the 1-output group to the 0-output group, and
    line bundles interconnecting each output group of each of the dilated routing nodes in a given one of the stages to a predetermined input group of a pre-selected one of the dilated routing nodes in the next succeeding one of the stages, wherein the dilated routing nodes are interconnected as a divide-and-conquer interconnection network and each of the dilated routing nodes is a concentrator.

3. A switching system for routing input signals-comprising:
    a plurality of dilated routing nodes arranged in a plurality of stages, each of the dilated routing nodes being generated by enlarging a conventional routing node by a predetermined factor, each of the dilated routing nodes having a 0-input group and a 1-input group, and a 0-output group and a 1-output group, each group sized according to the predetermined factor, and each of the dilated nodes including means, responsive to the input signals which include 0-bound or 1-bound signals with respect to each of the dilated routing nodes, for statistically routing the 0-bound input signals to the 0-output group and 1-bound input signals to the 1-output group and routing a number of the 0-bound input signals exceeding a size of the 0-output group to the 1-output group, and routing a number of the 1-bound input signals exceeding a size of the 1-output group to the 0-output group, and line bundles interconnecting each output group of each of the dilated routing nodes in a given one of the stages to a predetermined input group of a pre-selected one of the dilated routing nodes in the next succeeding one of the stages, wherein each of the dilated routing nodes is a 2n×2n 2n-to-n concentrator to form the system as a plurality of 2n×2n 2n-to-n concentrators and wherein the 2n×2n 2n-to-n concentrators are interconnected as a divide-and-conquer interconnection network.

* * * * *